(No Model.)
N. TESLA.
METHOD OF ELECTRICAL POWER TRANSMISSION.
No. 405,859. Patented June 25, 1889.
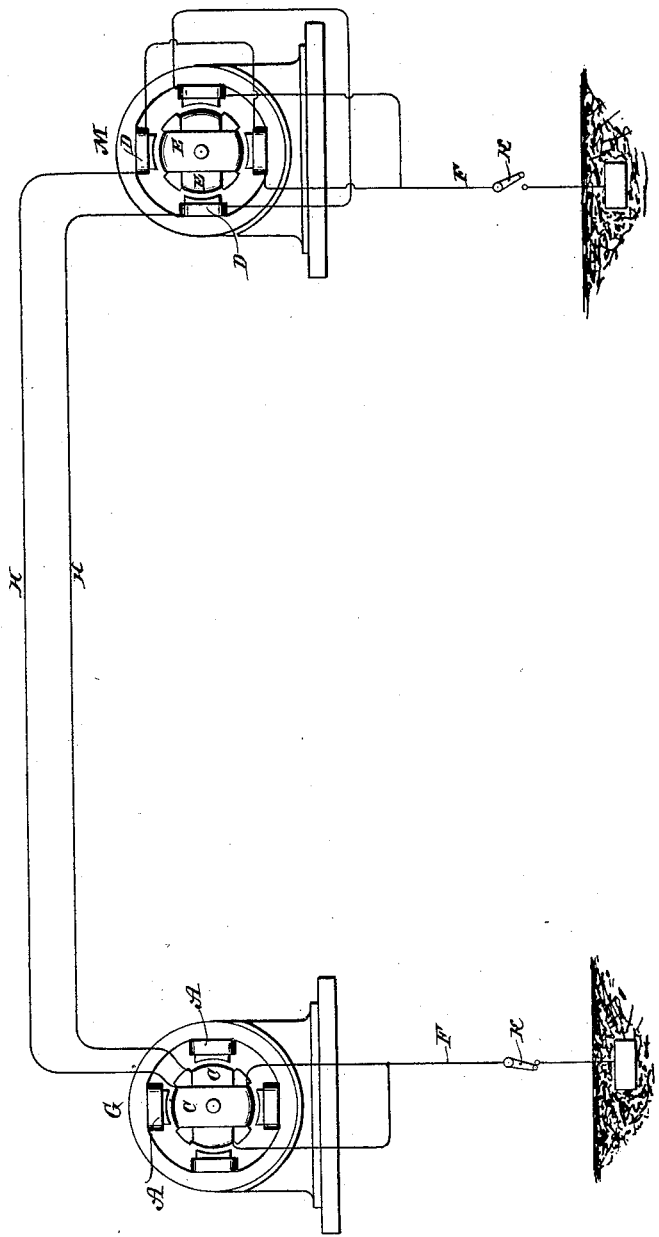
Witnesses:
Raphaël Netter
Robt. F. Gaylord
Inventor
Nikola Tesla
By
Duncan, Curtis & Page.
Attorney.

UNITED STATES PATENT OFFICE.

NIKOLA TESLA, OF NEW YORK, N. Y., ASSIGNOR TO THE TESLA ELECTRIC COMPANY, OF SAME PLACE.

METHOD OF ELECTRICAL POWER TRANSMISSION.

SPECIFICATION forming part of Letters Patent No. 405,859, dated June 25, 1889.

Application filed March 14, 1889. Serial No. 303,251. (No model.)

*To all whom it may concern:*

Be it known that I, NIKOLA TESLA, a subject of the Emperor of Austria, from Smiljan, Lika, border country of Austria-Hungary, residing at New York, in the county and State of New York, have invented certain new and useful Improvements in Methods of Electrical Power Transmission, of which the following is a specification, reference being had to the drawing accompanying and forming a part of the same.

This application is for a specific method of transmitting power electrically, shown and described in, and covered broadly by the claims of, an application filed by me February 18, 1889, No. 300,220.

As is well known, certain forms of alternating-current machines have the property, when connected in circuit with an alternating-current generator, of running as a motor in synchronism therewith; but, while the alternating current will run the motor after it has attained a rate of speed synchronous with that of the generator, it will not start it; hence, in all instances heretofore where these "synchronizing motors," as they are termed, have been run, some means have been employed to bring the motors up to synchronism with the generator, or approximately so, before the alternating current of the generator is applied to drive them. In some instances mechanical appliances have been utilized for this purpose. In others special and complicated forms of motor have been constructed.

My present invention is an improvement in methods of operating these motors and involves a new and improved plan of bringing the motor up to the proper rate of speed, that it may be run in synchronism with the generator.

The expression "synchronism with the generator" is used herein in its ordinary acceptation—that is to say, a motor is said to synchronize with the generator when it preserves a certain relative speed determined by its number of poles and the number of alternations produced per revolution of the generator. Its actual speed, therefore, may be faster or slower than that of the generator, but it is said to be synchronous so long as it preserves the same relative speed.

In carrying out my present invention I construct a generator with two coils or sets of coils and a motor with corresponding energizing coils or sets of coils. By means of two line-wires one terminal of each generator-coil or set of coils is connected to one terminal of its corresponding motor-coil or set of coils, while the opposite terminals of the generator-coils are joined together and likewise those of the motor.

To start the motor I establish temporarily an electrical connection between the points of connection between the coils in the generator and those in the motor, so that the system becomes an ordinary double-circuit system identical with that described in my patent, No. 390,413, of October 2, 1888, except that the generator and motor are constructed in any well-known way with a strong tendency to synchronize. When by this plan of connection the motor has attained the desired speed, the earth-connection is severed, by which means the system becomes an ordinary single-circuit synchronizing system.

In the drawing I have illustrated this method by a diagram.

Let G represent an ordinary alternating-current generator having four field-poles A, permanently or artificially magnetized, and an armature wound with two coils C connected together in series.

Let M represent an alternating-current motor with, say, four poles D, the coils on which are connected in pairs and the pairs connected in series. The motor-armature should have polar projections and closed coils E.

From the common joint or union between the two coils or sets of coils of both the generator and motor an earth-connection F is established, while the terminals or ends of the said coils or circuits which they form are connected to the line-conductors H H.

Assuming that the motor is a synchronizing motor, or one that has the capability of running in synchronism with the generator, but not of starting, it may be started by the above-described plan by closing the ground-connection from both generator and motor. The system thus becomes one with a two-circuit generator and motor, the ground forming a common return for the currents in the two wires H H. When by this arrangement of circuits the motor is brought to speed, the ground-connection is broken between the generator or motor or both and ground, switches K K being employed for this purpose. The motor then runs as a synchronizing motor.

This system is capable of various useful applications which it is not necessary to describe in detail; but it will be enough to say that the convertibility of the system from double circuit to single circuit is a feature in itself of great value and utility.

I do not wish to be understood as confining myself to the precise arrangement or order of connections herein set forth, as these may be obviously varied in many respects.

What I claim is—

1. The method of operating synchronizing motors herein described, which consists in electrically connecting intermediate points of the inducing-circuit of the generator and the energizing-circuit of the motor until the motor has reached a desired speed and then interrupting such connection, as set forth.

2. The method herein described of starting or operating synchronizing motors, which consists in electrically connecting intermediate points of the inducing-circuit of the generator and the energizing-circuit of the motor to earth until the motor has reached the desired speed and then interrupting either or both of the ground-connections, as set forth.

NIKOLA TESLA.

Witnesses:
EDWARD T. EVANS,
E. C. UPSTILL.